United States Patent Office 3,339,680
Patented Sept. 5, 1967

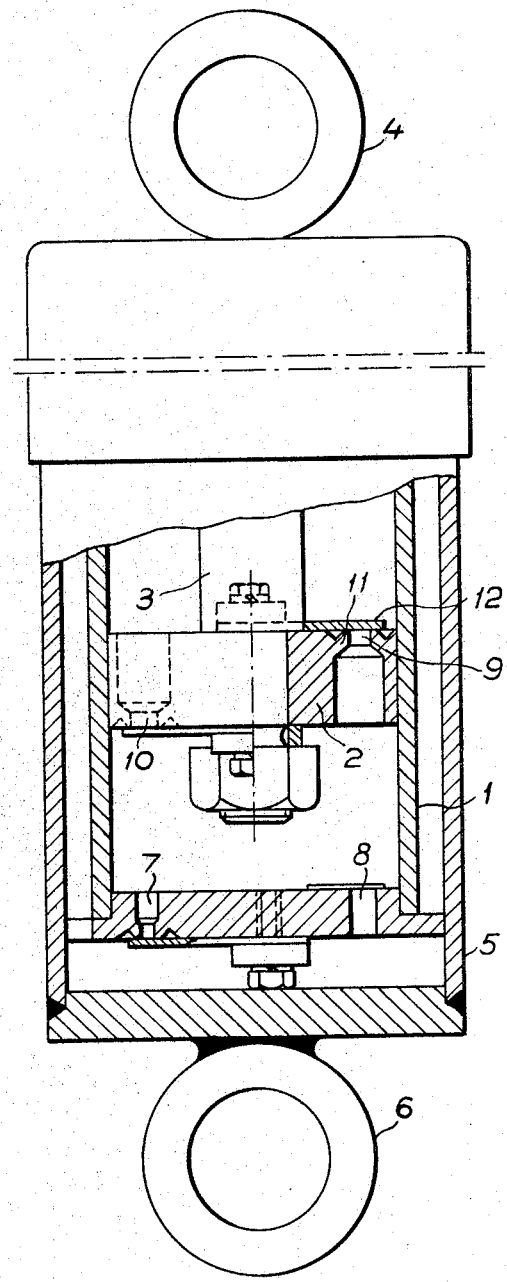

3,339,680
HYDRAULIC SHOCK ABSORBER
Eskil Tuneblom, Vasteras, Sweden, assignor to Allmänna
Svenska Elektriska Aktiebolaget, Vasteras, Sweden, a
corporation of Sweden
Filed Dec. 28, 1964, Ser. No. 421,313
9 Claims. (Cl. 188—96)

The purpose of the present invention is to effect a substantially temperature independent hydraulic shock absorber with substantially linear characteristic.

A hydraulic shock absorber contains a damping liquid which, when the attaching points of the shock absorber are moved in relation to each other, is made to flow through one or more through-flow valves with a certain flow resistance which is adapted to the field of operation of the shock absorber. The resistance to the mentioned relative movement between the attaching points of the shock absorber which is thus obtained is said to have a linear characteristic if the magnitude of the resistance force is in linear ratio to the speed of said movement. The resistance in the through-flow valves is partly dependent upon the speed of the flowing liquid and partly on its viscosity. Since the viscosity in most shock absorber liquids is in turn dependent upon the temperature, this means that most of the known shock absorber types give completely different shock absorption in cold and warm weather or when the temperature of the absorbing liquid alters for other reasons. One exception from this rule is formed by the shock absorbers which are provided with nozzle valves, but such shock absorbers have not linear but square characteristic, i.e. the absorbing force is dependent upon the square of the speed of movement.

In order to avoid the above mentioned disadvantages with known shock absorber types the through-flow valves according to the invention are formed so that one valve body is pressed by a resilient member against a preferably circular valve seat with the least possible width, preferably less than 10% of the diameter of the valve seat opening, whereby the cross section area of the valve seat opening is dimensioned so that, at the highest calculated absorbing speed of the shock absorber in normal operation, the pressure drop in the gap between the valve body and the valve seat is between 75 and 99%, preferably between 85 and 95% of the total pressure drop in the through-flow valve. In this way a through-flow valve is obtained in which the length of the through-flow gap in the direction of flow and the width perpendicular to the direction of flow are as small as possible while on the other hand the height of the gap, i.e. the lift of the valve body is instead relatively great. Since that part of the flow resistance which is dependent on the viscosity of the flowing liquid is strongly influenced by the length and width of the through-flow gap, a through-flow valve is obtained according to the invention in which the viscous part of the pressure drop will be a minimum or, in other words, the absorbing force will be substantially independent of the viscosity of the operating liquid, and consequently also of the temperature.

In known shock absorbers the valves are formed according to completely different principles and their through-flow areas are therefore so large that even at high speeds practically all flow-resistance, i.e. over 99% is concentrated in the valve gap itself.

In order to obtain the least possible width in the through-flow gaps measured perpendicularly to the direction of flow, the circumference of the seat should be made as small as possible. Preferably a circular valve seat is therefore chosen, whereby the gap width, i.e. the circumference of the ring-shaped seat is directly dependent on the size of the cross section area. It is of course impossible in practice to make the through-flow area of the valve seat opening too small, since with decreased through-flow area the flow resistance in front of the valve gap, particularly at high flow speeds, will have considerable importance in comparison with the resistance in the gap itself. An optimum cross sectional area is thus aimed at, with which the disadvantages of too small a cross section area are not noticeably permitted to decrease the important advantages which a small cross sectional area in this case involves. In order to find the optimum range the flow-resistance, i.e. the pressure drop in the valve gap should suitably be compared with the total pressure drop in the valve at the highest relative speed with which the attaching points of the shock absorber may be expected in normal operation to move in relation to each other. The cross sectional area of the valve seat opening may then be easily dimensioned so that the first mentioned pressure drop is between 75 and 99% of the latter, whereby a shock absorber is obtained which substantially fulfills the requirements set forth. Since in principle it is a question of balancing between two opposing factors it is obvious that the result is normally less favourable the nearer one approaches to the limit values given. It is therefore in many cases advantageous to allow the pressure drop in the valve gap to be between 80 and 97% of the total pressure drop in the valve and the most favourable result is generally obtained between 85 and 95%. The determining factor for the lower limit of the cross sectional area of the valve seat opening is that the flow resistance in the valve gap in every case must comprise the largest part of the total resistance of the valve so that the viscous part of the flow resistance in the other parts of the valve shall have some noticeable influence on the total flow resistances in the whole valve including the valve gap.

The highest absorbing speed calculated to arise in normal operation forms a basic starting value when constructing all types of shock absorbers. In certain cases when great uncertainty prevails concerning this speed or when exceptionally high speeds may occasionally occur under particularly unfavourable conditions, i.e. so seldom that it is not economical to dimension the whole shock absorber for these exceptions, the absorber is provided with some form of safety device, for example, a blow-off valve which upon such extreme overloading comes into opertion and decreases the pressure in the pressure chamber of the shock absorber. When the shock absorber is provided with such a safety device, the highest absorbing speed at normal operation should be calculated as that speed at which the safety device comes into operation.

Since the length of the valve gap in the flow direction and the width perpendicular to this should be kept as small as possible without causing too small a through-flow area in the valve seat opening, it is obvious that the number of through-flow valves in the shock absorber should be limited to a minimum. It is therefore most advantageous to arrange only one through-flow channel for each direction of flow, but this of course does not prevent the shock absorber from also being provided with other valve regulated through-flow channels, for example, blow-off valves, for special loads. So that connection conduits to the through-flow valves shall be unnecessary, the valves are suitably attached to the shock absorber piston in a manner known per se.

One embodiment of the invention will be more clearly illustrated with reference to the accompanying drawing which shows schematically a shock absorber according to the invention partly in cross section.

In the drawing 1 designates an inner cylinder completely filled with liquid in which a piston 2 is movably arranged. The piston rod 3 of the piston 2 is in communication with one attaching point 4 of the shock absorber and the cylinder 1 is rigidly attached to an outer cylinder 5 which supports the opposite attaching point 6 of the shock absorber. In the piston 2 there are preferably only two oppositely directed through flow valves 9 and 10 which allow the liquid to flow in opposite directions through the piston 2. The valves consist of a narrow ring-shaped seat 11 and a valve body 12 which is resiliently pressed against the seat. The valve body is in this case formed of a plane resilient plate which abuts against the valve seat. The ring-shaped seat is constructed by providing the plane piston surface or face with a ring-shaped groove which is concentric with the valve opening, so that the portion of the face around the value seat recedes from the valve seat. Since thus the valve seat is in the same plane as the resilient plate 12 in its rest position, the advantage is gained that the valve opens at a very slight pressure against the valve body, i.e. the resilient plate 12. As mentioned earlier, the width of the ring-shaped valve seat is made as small as is in practice possible in order to decrease the viscosity-dependent loss factor of the flow. Even with very large shock absorbers, it should be possible for the width of the valve seat to be less than 1 mm. and in most cases it may with advantage be less than 0.3 mm. A further important advantage with the valve type shown is obtained because the through-flow duct of the valve is completely free from loss-causing construction elements such as attaching means for the valve body or the like. The valve body may also be formed for example of a spring loaded ball, in which case attaching means must be placed in the through-flow duct, but only beyond the valve gap where the cross sectional area may be made so large that these means do not cause any substantial increase of the flow-resistance in the valve.

Since the piston rod 3, in dependence on its position, takes up a greater or smaller part of the volume in the inner cylinder 1, the latter must be in communication with the outer cylinder 5 which is only partly filled with liquid, through the valves 7 and 8 for outlet and supply of liquid, respectively. The valve 7 has a somewhat greater flow-resistance than the valve 9 so that no under pressure is formed in the cylinder 1 above the piston 2 when this moves downwards. The valve 7 must therefore be formed according to the same principles as the valves 9 and 10, while on the other hand the valve 8, which should preferably have as little flow-resistance as possible, may be formed as an ordinary non-return valve.

The invention is not limited to the embodiment shown. The through-flow valves may, for example, be placed in a different way, or even on different parts of the shock absorber. The valve body and valve spring may be composed of separate units or in some other way given a modified form. Otherwise, several embodiments of the invention are possible within the scope of the following claims.

I claim:

1. In a hydraulic shock absorber having a damping liquid therein and having through-flow control means for said damping liquid, said control means comprising a part having a through-flow duct therein, said part having in one face means forming, an annular valve seat surrounding a part of said through-flow duct, the portion of the face around the valve seat receding away from the valve seat, a valve body, and resilient means urging said valve body against said seat, the portion of said through-flow duct adjacent said valve seat being considerably narrower than its other parts, said control means being so dimensioned that at the highest calculated absorbing speed of the shock absorber in normal operation the dynamic pressure drop in the gap between said valve body and said valve seat is between 75 and 99 percent of the total pressure drop in the through-flow means.

2. Shock absorber according to claim 1, in which, at the mentioned speed, the dynamic pressure drop in the gap between the valve body and valve seat is between 80 and 97 percent of the total pressure drop in the through-flow means.

3. Shock absorber according to claim 1, in which, at the mentioned speed, the dynamic pressure drop in the gap between the valve body and valve seat is between 85 and 95 percent of the total pressure drop in the through-flow means.

4. Shock absorber according to claim 1, in which said valve seat is annular with a width of not more than 1 mm.

5. Shock absorber according to claim 1, in which at least that portion of said through-flow duct facing the valve body is completely free of construction elements impending the flow.

6. Shock absorber according to claim 1, having only two main through-flow ducts for normal operation, one for each direction of flow in the forward and backward movements of the shock absorber.

7. Shock absorber according to claim 1, having a piston, the through-flow means being located in said piston, said piston being connected to an attachment point of the shock absorber.

8. Shock absorber according to claim 1, in which the valve body and the resilient means are constituted by a resilient plate which in rest position abuts against the valve seat.

9. Shock absorber according to claim 8, in which said annular valve seat forms part of a substantially plane surface having an annular groove therein surrounding said valve seat.

References Cited

UNITED STATES PATENTS

| | | | |
|---|---|---|---|
| 1,135,923 | 4/1915 | Reynolds | 188—88 |
| 2,036,955 | 4/1936 | Padgett | 188—88 |
| 2,138,513 | 11/1938 | Rossman et al. | 188—88 |
| 3,098,546 | 7/1963 | Karlgaard | 188—88 |
| 3,204,728 | 9/1965 | Powell | 188—96 |

FOREIGN PATENTS

| | | |
|---|---|---|
| 535,732 | 2/1955 | Belgium. |
| 546,899 | 8/1956 | Italy. |

MILTON BUCHLER, *Primary Examiner.*

FERGUS S. MIDDLETON, *Examiner.*

G. E. HALVOSA, *Assistant Examiner.*